United States Patent Office 3,141,339
Patented July 21, 1964

3,141,339
CONTROL DEVICE USING GYROSCOPE PRECESSION FOR MEASUREMENT OF DISPLACEMENT
Milo Koril, Stuttgart-Bad Cannstatt, Germany, assignor to Bölkow-Entwicklungen Kommanditgesellschaft, Ottobrunn, near Munich, Germany
Filed June 20, 1961, Ser. No. 118,429
Claims priority, application Germany June 28, 1960
15 Claims. (Cl. 73—504)

This invention relates to means for measuring and adjusting very small speeds, such as the feeding speeds of automatic machinery, and more particularly to an improved device of this type by which a finer control and measurement of the speed may be obtained and which is effective over a larger range of feeding speeds.

The necessity for very exactly measuring very low rates of speed, of the order of about 1 mm. per minute, is a requirement in machine tools or the like provided with hydraulic or pneumatic feeds. While it is true that the feeding velocity or feeding speed is continuously adjustable in such machines, the adjusted values cannot be reproduced with sufficient exactness, and therefore it is not possible to properly gauge or calibrate the adjusting devices so as to provide an exact correlation between the actual speed and the indicated speed. In order to obtain an optimum control of the feeding rate of machines having hydraulic or penumatic feeding means, special speed measuring devices are necessary. Two general types of speed measuring instruments are known for this purpose.

In the first general type of speed measuring device, a combination of mechanics and hydraulics is employed. The feeding of the machine tool moves a piston in a cylinder whereby a medium present in the cylinder is compressed and can escape through a nozzle or a diaphragm. The differential pressure this effected in the cylinder can then be used as a measure of the feed rate of velocity, and the measured differential pressure can be read from a pressure gauge or a manometer. This arrangement can be used only if the precision of the speed measurement is not too important. In addition, the range of measurements, which is dependent upon the dimensions of the nozzle, is rather limited, and cannot be readily changed or augmented in a simple manner.

The second general type of measuring arrangements for feed speeds operates on an electronic basis. A mechanical-electrical transducer, such as an electrical resistance, inductance, or capacitance, is mechanically coupled to the movable feeding part of the machine tool so as to convert the velocity of the feed movement directly into a change of an electrical magnitude. This change in electrical magnitude is then amplified, usually by an electronic amplifier, and, if necessary or desired, is converted in such a manner that it may be indicated by a voltage or current measuring device, such as a voltmeter or an ammeter. Speed measuring arrangements of this type require a considerable expenditure for amplifier means, such as electronic tubes or transistors. In addition, the construction of such a speed measuring device is complicated and troublesome, as well as involving considerable expense.

It is also known to use, in the measuring and adjustment of very small speeds, an arrangement wherein the transducer, transmitter or converter comprises a gyroscope mounted in the usual manner in gimbals which are resiliently restrained against movement. This gyroscope has a constant angular velocity. In measuring speed, a rotational movement is imparted to the outer gimbal and corresponds to the speed or velocity to be measured. Thereby the axis of rotation of the gyroscope and, thus, the inner gimbal frame, have imparted thereto a precession deflection which is proportional to the velocity. A mechanical-electrical transducer is then adjusted in accordance with the deflection of such rotational axis, and the electrical measuring value can be read by a suitable indicating device which converts the electrical measurement into feed rate indications.

The means for moving the outer gimbal frame usually comprises a gear or a friction rod cooperating with a mating wheel on the driving shaft for moving the outer gimbal frame. The drive can also be effected by an endless traction member which has an effectively large wraparound angle at the driving wheel. The driving mechanism preferably includes a coupling element in the nature of a one-way clutch or the like so that the measuring instrument can be connected or disconnected at will. This coupling means preferably includes a free wheeling device, or one-way clutch, or if an endless traction member is employed, then a mechanical or magnetic follower device is used. This is done because in machine tools, for example, a measurement of the velocity of the rapid movement is not required.

The magnitude of the precession, which is dependent upon the degree of movement of the rotational axis of the gyroscope, is utilized in a simple manner for controlling the speed or velocity to be measured. Thus, this measured magnitude is fed back to the feed member to control the speed of the latter, such as by controlling an electric motor operating the feeding means, so that the speed measuring device also becomes a control device for maintaining the feeding speed at a selected value.

Known speed measuring and controlling devices of this type include a gyroscope which is driven at a constant angular velocity in the same direction at all times. Such a constant angular velocity may be obtained, for example, by using reversible pole synchronous motors. However, the speeds of such motors are adjustable only in relatively large steps. Where a relatively large continuous adjusting range is required, it is relatively difficult to construct the restoring means which counteract the precession deflections of the gyroscope.

The present invention is directed to a measuring instrument of the gyroscope type just described, but improved so that more precise control and a greater range of speed control may be obtained. In accordance with the invention, advantage is taken of the fact that the direction of the precession deflections are dependent upon the direction of rotation of the gyroscope, and the gyroscope is constructed so as to be reversible with respect to its direction of rotation. Associated with this reversible direction gyroscope are restoring means having varying restoring values. In accordance with a further feature of the invention, such restoring means are constructed in such a manner that their restoration characteristics complement each other in a stepless or continuous manner.

In accordance with a further feature of the invention, the restoring means may be in the form of flat springs, torsion springs or coil springs, and these springs may be interchangeable or reversible, preferably in such a manner that successive changes in the value of the restoring means provide a stepless or continuous change of the measuring or adjusting range. By reversing the direction of rotation of the gyroscope, which may be driven by a direct current motor or by a three-phase synchronous motor, or which may actually be constructed as such a direct current or three-phase synchronous motor, the measuring and adjusting deflections pertinent to the respective rotational directions of the gyroscope can be made to complement each other.

An interchange of the restoring means is only necessary in case the step-by-step changes in the rotational speed of the gyroscope, and the reversal of its direction of rotation, are not sufficient to measure or control a speed range of the value desired. The invention arrangement may, when desired, be arranged to measure and control all the feed velocities necessary with a particular working procedure, either by reversing the rotational direction of the gyroscope or by changing the speed of the gyroscope. Such changes may be effected in a very simple manner and, with very little expense, it is possible to provide from two to six ranges of speed adjustment. By reversing the direction of rotation of the gyroscope, a doubling of the adjusting range can be attained. Such changes in the rotational direction of the gyroscope may be effected by a reversal of its poles, or example.

The invention arrangement covers a very wide range of feeding speeds and can be readily adapted to various kinds of speed adjusting programs by suitably selecting the resilient restoring means and interchanging the latter so that the measuring and adjusting functions can be combined in various manners. Furthermore, the measuring range may be enlarged simply by provision of electrical switches so that the synchronous motor may be fed with alternating current of higher or lower frequencies as desired.

By means of a mechanical or electrical transducer, the adjusting movement of the gyroscope axis, due to the aforementioned precession deflection, is converted into a corresponding change in an electrical magnitude and this electrical magnitude is applied to an indicating instrument whose scale may be calibrated in feed velocities. Alternatively, or additively, the electrical magnitude may be applied to a regulating device, preferably with amplification, to control the speed of the driving means for feeding of the machine tool.

The mechanical-electrical transducer preferably comprises a center tapped voltage divider for measuring precessional displacements of the gyroscope rotational axis in either of two directions, the two sections of the voltage divider having resistance values corresponding to the mechanical characteristics of the mechanical restoring or resilient restraining for the gyroscope. In other words, the characteristic curves of the restoring means are so related to the characteristic curves of the two sections of the voltage divider that a value of indicated speed or indicated control voltage is obtained which is dependent upon time and related to the particular feeding operation involved.

In accordance with the invention, the restoring means, the voltage divider, or both, are arranged to have either a linear or non-linear variation in such a manner that an ultimate value is obtained which constitutes, with relation to time, a linear or constant function. Furthermore, by interchanging the restoring means with others, having different values, such as springs of different strengths, or by interchanging the two sections of the voltage divider with resistances having different values, the desired relation of values may be obtained. Thereby, feeding speeds are obtained which are constant functions which may have a step-wise relation between ranges of adjustment. Such characteristics of adjustability in a step-wise manner are required, for example, in the machining or cutting of working material by removing successive layers from the work piece.

The precession movement of the gyroscope is transformed into a corresponding movement of the movable contact of the voltage divider, and a correspondingly varied voltage output is derived by applying an auxiliary potential between the center tap and the ends of the voltage divider.

In one modification of the mechanical-electrical transducer, the outer ends of the voltage divider are connected to each other, and the auxiliary potential is applied between the center tap of the voltage divider and the joined outer ends thereof. With this arrangement, another voltage divider, serving as an adjustment control, is connected in parallel with the auxiliary potential source. With this arrangement, the control voltage is derived between the two movable taps of the voltage dividers and applied to the tool feed drive, if necessary through an amplifier. By means of the adjusting control, a desired adjustment of the feed velocity can be effected.

For an understanding of the principles of the invention, reference is made to the following description of typical embodiments thereof as illustrated in the accompanying drawings.

Figure 1:
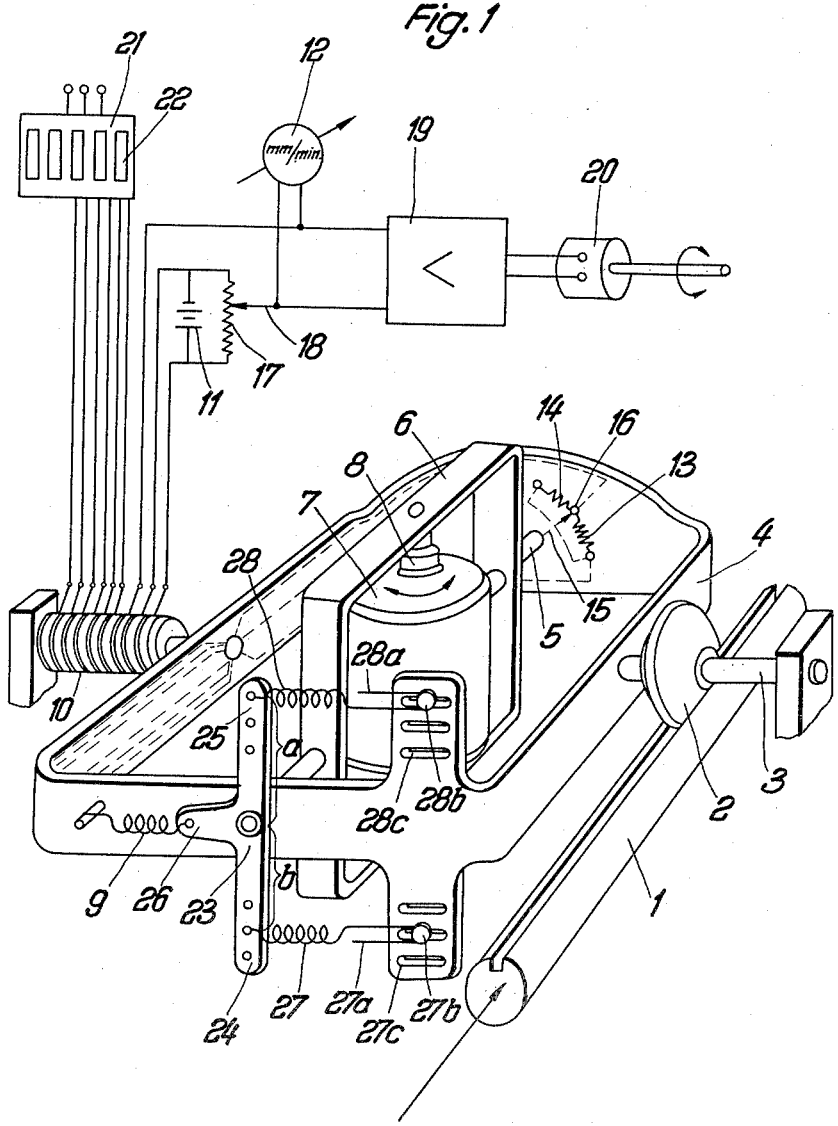
FIG. 1 is a part perspective view and part schematic wiring diagram of one embodiment of the invention.

Referring to FIG. 1, suitable driving means, such as a friction rod 1 which is connected with a movable machine part whose speed relative to a stationary machine frame is to be measured and adjusted, is illustrated as operating suitable driven means, such as a friction wheel 2 which may have a free wheeling device built thereinto. Either directly, or through the medium of such free wheeling device, the friction wheel 2 is secured to a drive shaft 3 fixed to the outer gimbal frame 4 of a gyroscope device. Frame 4 rotatably supports an axle or shaft 5 extending perpendiculaly to the drive shaft 3 and carrying an inner gimbal frame 6 which is rockable relative to the outer gimbal frame 4 about the axis of the shaft 5. Inner gimbal frame 6 supports a gyroscope 7 whose axis of rotation 8 extends perpendicularly to the axles or shafts 3 and 5.

A spring arrangement, comprising springs 9, 27 and 28, is connected between the inner and outer gimbal frames 4 and 6 and serves to restrain the inner gimbal frame 6, and thus the rotational axis 8 of the gyroscope 7, in the illustrated perpendicular relation to the outer frame 4 except when the outer frame 4 is rotated. It will be noted that the rotation axis 8 of the gyroscope 7 extends perpendicularly to the shaft 3.

The gyroscope 7 is electrically driven and preferably comprises a polyphase induction motor, such as a three-phase motor of the external rotor type, having an internal armature fixed relative to the axis of shaft 8. On the left hand end of shaft 3, as viewed in FIG. 1, nine slip rings 10 are provided through which both the supply current for the gyroscope 7 and the potential of an auxiliary potential source 11 is applied to the gyroscope system, and through which an indicating device 12 is connected to the gyroscope system. The potential source 11 may be stabilized if necessary or desirable.

Connected between the gimbal frames 4 and 6 is a voltage divider comprising resistances 13 and 14 adjustably secured to the outer gimbal frame 4 in such a manner that, when the gimbal frames 4 and 6 are arranged in perpendicular relationship, a movable tap 15 engages the center tap 16 of the voltage divider. Movable tap 15 is secured to the axle 5. The characteristics of resistances 13 and 14 are so selected as to conform to the characteristics of the restoring means resisting precession deflections of the gyroscope.

A second voltage divider, comprising a resistance 17 and a movable tap 18, is connected in parallel with the voltage divider 13–14–15–16 through the medium of the slip rings 10. Preferably, the ends of the resistances 13 and 14 are connected to each other and to one end of the resistance 17, with the center tap 16 connected to the other end of the resistance 17. The adjustable tap 18 associated with the resistance 17 acts as a control device for adjusting the desired feed velocity to be effected by the control system. The control voltage is derived from the auxiliary potential source 11, connected across resistance 17, and which may be stabilized. This voltage 11 is applied between the interconnected outer ends of the resistances 13 and 14 and the center tap 16.

The indicating, measuring, and control voltage is derived between the movable taps 15 and 18, and is applied to an indicating device 12 and preferably also to a servo-motor system 20 through the medium of an amplifier 19. The servo-motor system 20 is arranged to control the feeding speed of a machine not shown in the drawing; said machine having a movable part whose relative speed as compared to the stationary machine frame is transmitted through friction rod 1 to drive shaft 3 of the gyroscope device. A polyphase A.C. current, such as a three-phase A.C. current, is applied, through a push button switch 21 and slip rings 10, to the motor of the gyroscope, whose speed and direction of rotation may be varied. The gyroscope motor can be driven in either direction by means of selective operation of the push buttons 22, and may also be driven in either opposed directions at selected constant angular velocities.

In the operation of the system, it is desirable to proceed in such a manner that, by means of using the push buttons 22, the desired angular velocity or the desired rotational direction of the gyroscope can be selected while the measuring and control circuit is inoperative. In order to prevent any incorrect indication or control, the measuring and control work circuit is only connected or made operative after a pre-set time delay requisite for the gyroscope to attain its synchronous speed. Automatically acting braking means, of a known type, can be built into the gyroscope to rapidly decelerate the gyroscope when its rotational direction is to be reversed.

At the forward end of the axle 5, as viewed in FIG. 1, there is fixed a three-armed lever 23 having arms 24, 25 and 26. The springs 27 and 28 may be interchangeably and adjustably connected to the lever arms 24 and 25, so as to obtain varying lever lengths, such as indicated at "a" and "b" in the drawings. The free or outer ends 27a and 28a of the springs embrace pins 27b and 28b which are adjustably secured in elongated holes or slots 27c and 28c of the outer frame. The springs are so adjusted that, when the gyroscope gimbal frames 4 and 6 are perpendicular to each other, the springs 27 and 28 are just barely released.

A very large range of measurements may be obtained by providing springs 27 and 28 with different elasticities and by connecting the springs to the lever arms 24 and 25 at varying distances from the pivot of the lever 23, which is the axis of the shaft 5. By so doing, a measuring range ratio of 1:10 may be obtained. This enlargement of the measuring range may also be effected, in the direction of higher feed velocity, by providing, in addition, a spring 9 connected between the lever arm 26 and the outer gyroscope frame 4.

Figure 2:
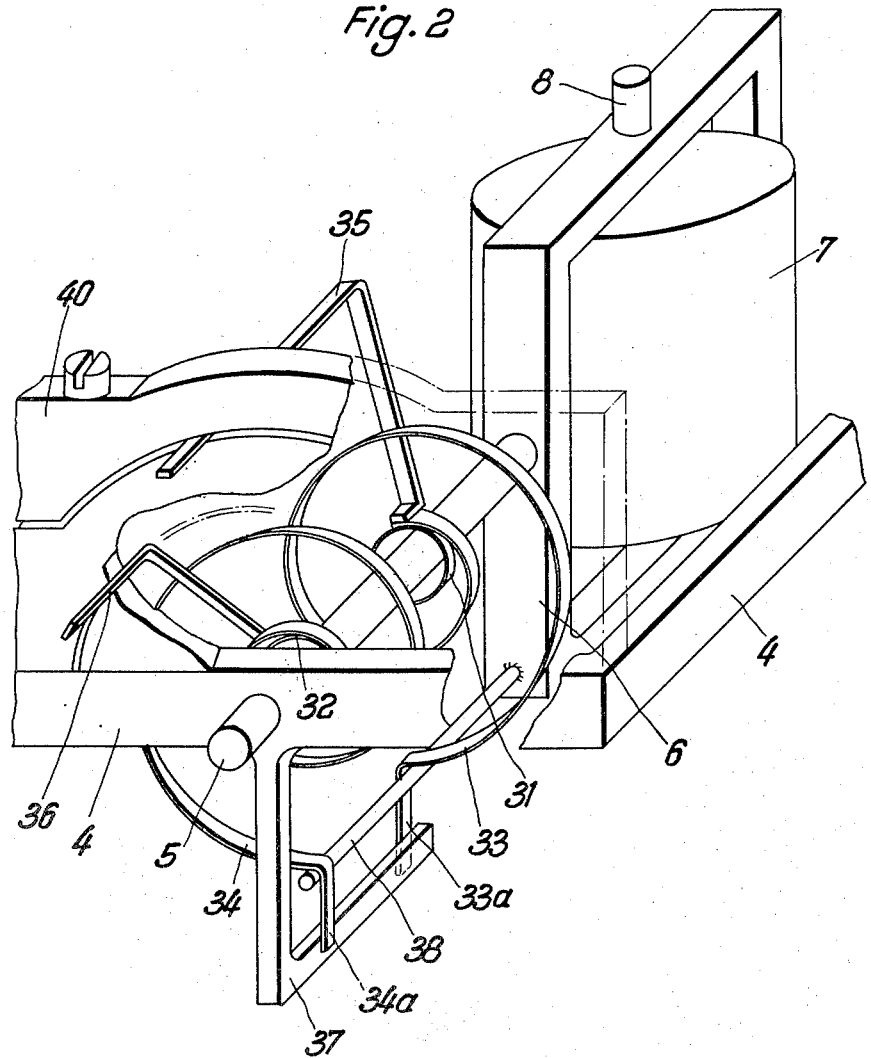
FIG. 2 is a partial perspective view illustrating a restoring means in the form of opposed spiral springs.

FIG. 2 illustrates an alternative embodiment of the restoring means in which the restoring force is proportional to the degree of precession. In this figure those parts which correspond to the parts of FIG. 1 have been given the same reference numerals.

In the arrangement shown in FIG. 2, two sleeves 31, 32 are mounted with some play on the shaft 5, and the inner ends of two spiral springs 33 and 34 and of two adjusting levers 35 and 36 are secured to the respective sleeves 31 and 32. The outer ends 33a, 34a of the springs, which latter are wound in opposed directions, extend angularly relative to the springs. These outer ends engage opposing surfaces of a bearing formed by a stirrup 37 of the outer gimbal frame and an abutment 38 secured to the inner gimbal frame. The free ends of the adjusting levers 35 and 36 are secured within a clamping device 40 carried by the outer gimbal frame 4. The adjustment of the springs 33 and 34 may be effected, independently of each other so as to obtain a preselected tension relative to the stirrup 37, by means of the adjustable positioning of the levers 35 and 36 in the clamping device 40.

When the inner gyroscope frame 6 turns clockwise, as viewed in FIG. 2, the abutment 38, which is secured on the inner gimbal frame 6, tensions the spring 33 so as to disengage the free end 33a of the spring from the stirrup 37. In this direction of movement of the gyroscope frame 6, the spring 34 has no effect. The abutment 38, which is thus moved clockwise above the axis of shaft 5, disengages the spring 34 so that the free end 34a of the latter will bear against the stirrup 37. An analogous effect occurs when the inner gimbal frame is rotated in a counter clockwise direction and, in such cases, spring 34 becomes active and the spring 33 remains idle.

In the place of the two springs 33 and 34, four springs, for example, may be provided, two of which are always associated with one direction of rotation of the inner gyroscope frame 6 and two of which are always associated with the other direction of rotation of the inner gyroscope frame 6. The abutment 38 may be reversible. For example, it may be constructed in the form of a coulisse which is slidable or displaceable in a direction parallel to the axis 5 and which can be brought into cooperation with either one or both of the two springs of each pair. If the restoring means is constructed so as to be reversible in operation, then the stirrup 37 is disposed at a smaller distance from the axis of the shaft 5 than when such a coulisse is substituted for the abutment 38.

While mechanical springs have been shown as a restoring means, it should be understood that hydraulic, pneumatic or magnetic restoring means may be used.

If, as viewed in FIG. 1, the friction rod 1 is moved in the direction of the arrow, then the outer gimbal frame 4 is rotated about the axis of shaft 3. The axis 8 of the constant angular velocity gyroscope 7 has thus imparted thereto a precession deflection which is proportional to the speed of movement of the friction rod 1 in the direction of the arrow. The precession forces thus acting on the gyroscope are opposed by the springs 9 and 27, or 9 and 28, dependent upon the direction of such precession. Furthermore, due to the rotation of the shaft 5, the movable tap 15 of the voltage divider 15–16–13–14 is moved toward the outer end of one of the resistances 13 and 14, again depending upon the direction in which the precession displacement occurs. Due to such deflection of the movable tap 15, an indicating and control voltage is produced between the movable taps of the two voltage dividers and this indicating and control voltage is supplied to the indicating device 12 which may have a scale on which the adjusted feed velocity can be read directly, as in millimeters per minute. Also, the same voltage may be applied through the amplifier 19 to the servo-motor 20 controlling the feeding of the machine tool. If a coupling is provided on the shaft 3, in place of the friction wheel 2, and if the device is connected with a slowly rotating shaft, then the invention arrangement may be used for the measurement or control of very low rotational speeds.

Figure 3:
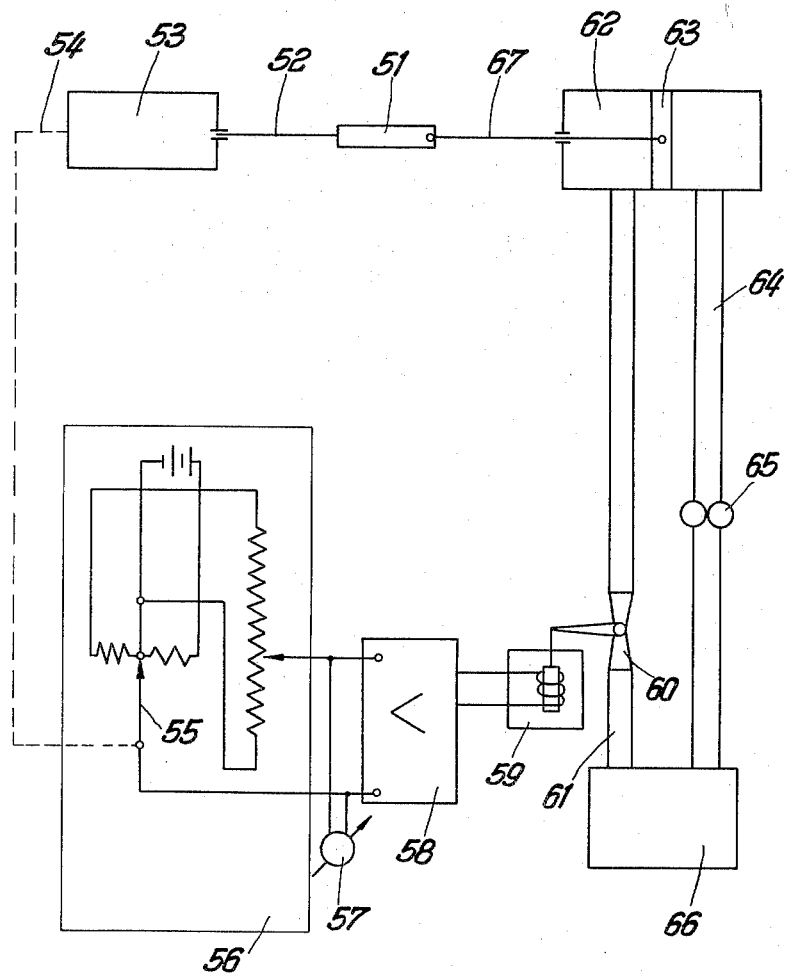
FIG. 3 is a schematic block diagram of a control system embodying the invention.

FIG. 3 illustrates the overall arrangement in a schematic manner. The movement of the work piece 51, which movement is to be measured or controlled, is applied through a sensing rod 52 to a device 53 provided with a gyroscope, and thereby such movement is transformed by the device 53 into a mechanical adjusting magnitude. This mechanical adjusting magnitude is applied through a shaft 54 to the movable tap 55 of a mechanical-electrical transducer 56 and a resulting adjusted indicating voltage is applied to an indicating device 57. The indicating device 57, if desired, may be in the form of a recording device for plotting the feed velocity.

The control voltage is further applied to an amplifier 58 connected in parallel with the indicating device 57. Another transducer 59 is connected to the output of the amplifier 58 and transforms the amplified control voltage into a mechanical magnitude which controls a valve 60 in the line 61 of a hydraulic device comprising a working cylinder 62, a piston 63, a line 64 in which is a pump 65, and a fluid container 66. By means of the piston rod 67, the work piece 51 is moved by the piston 63 at a feeding rate adjustable at the transducer 56. Any necessary damping can be effected, either electrically or mechanically, by a damping member provided at the gyroscope device 53, at the transformer 56, or at the amplifier 58.

While specific embodiments of the invention have been shown and described in detail to illustrate the application of the principles of the invention, it will be understood that the invention may be embodied otherwise without departing from such principles.

What is claimed is:

1. A device for measuring accurately velocities of very small magnitude comprising, in combination, a gyroscope including a mass rotatable at a substantially constant angular velocity about an axis of rotation; reversible electric driving means for rotating said mass in opposite rotational directions; means mounting said gyroscope for movement about a pair of mutually perpendicular mounting axes each perpendicular to the axis of rotation of said gyroscope; said gyroscope having a precession deflection about one of said mounting axes in proportion to the rate of angular movement of the latter about the other mounting axis; means operable to rotate said gyroscope bodily about such other mounting axis at a rate proportional to the velocity to be measured; first and second restoring means restraining precession of said gyroscope about said one mounting axis with a force constantly directly proportional to the precession forces; each restoring means restraining precession in a respective one of two opposite directions, and each restoring means being effective over a respective range of precession; said restoring means differing in restoring force, with the restoring force of each restoring means corresponding to its respective range of precession; an electro-mechanical transducer including components relatively displaceable responsive to such deflection; and electrically energized signal circuit means connected to said transducer to provide a continuous signal proportional to instantaneous values of supch precession; whereby, when said rotating means has rotated said gyroscope bodily about such other mounting axis in one direction and through one range of precession, said reversible electric driving means may be operated to reverse the direction of rotation of said mass so that, upon continued rotation of the gyroscope about the other mounting axis by said rotating means, said gyroscope will have a precession deflection in the opposite direction which will be opposed by the other of said restoring means, so that said gyroscope may be bodily rotated about such other mounting axis by said means through the two consecutive ranges of precession, with a different restoring means being effective in each range.

2. A device for measuring accurately velocities of very small magnitude comprising, in combination, a gyroscope including a mass rotatable at a substantially constant angular velocity about an axis of rotation; reversible electric driving means for rotating said mass in opposite rotational directions; a pair of gimbal means mounting said gyroscope for movement about a pair of mutually perpendicular mounting axes each perpendicular to the axis of rotation of said gyroscope; said gyroscope having a precession deflection about one of said mounting axes in proportion to the rate of angular movement of said gimbal means about such other mounting axis; means operable to rotate said gyroscope bodily about such other mounting axis at a rate proportional to the velocity to be measured; first and second restoring means restraining movement of said gimbal means relative to each other responsive to such precession with a force constantly directly proportional to the precession forces; each restoring means restraining precession in a respective one of two opposite directions, and each restoring means being effective over a respective range of precession; said restoring means differing in restoring force, with the restoring force of each restoring means corresponding to its respective range of precession; an electro-mechanical transducer including components mounted on each of such gimbal means and relatively displaceable responsive to such deflection; and electrically energized signal circuit means connected to such transducer to provide a continuous signal proportional to instantaneous values of such precession; whereby, when said rotating means has rotated said gyroscope bodily about such other mounting axis in one direction and through one range of precession, said reversible electric driving means may be operated to reverse the direction of rotation of said mass so that, upon continued rotation of the gyroscope about the other mounting axis by said rotating means, said gyroscope will have a precession deflection in the opposite direction which will be opposed by the other of said restoring means, so that said gyroscope may be bodily rotated about such other mounting axis by said means through the two consecutive ranges of precession, with a different restoring means being effective in each range.

3. A device for measuring accurately velocities of very small magnitude as claimed in claim 2, in which said restraining means is pre-settable as to relative restraining effect.

4. A device for measuring accurately velocities of very small magnitude as claimed in claim 2, in which said transducer produces a signal which is proportional to both the instantaneous value and direction of such precession.

5. A device for measuring accurately velocities of very small magnitude as claimed in claim 2, in which said restraining components continuously complement each other.

6. A device for measuring accurately velocities of very small magnitude as claimed in claim 3, in which said restraining means includes interchangeable restraining components of different restraining effect.

7. A device for measuring accurately velocities of very small magnitude as claimed in claim 2, in which said restraining means comprises springs.

8. A device for measuring accurately velocities of very small magnitude as claimed in claim 7, including arms fixed relatively to the one of said gimbal means which is adjustable about such one mounting axis, and extending vertically relative to such one mounting axis; each of said springs extending between one of said arms and the other gimbal means.

9. A device for measuring accurately velocities of very small magnitude as claimed in claim 8, in which said springs are connectable to such arms at different selected distances from such mounting axis.

10. A device for measuring accurately velocities of very small magnitude as claimed in claim 9, in which the other ends of such springs are adjustably connected to such other gimbal means.

11. A device for measuring accurately velocities of very small magnitude as claimed in claim 2, in which said electric driving means is operable at pre-selected different constant speeds.

12. A device for measuring accurately velocities of very small magnitude as claimed in claim 2, in which said transducer comprises a voltage divider mounted on one of said gimbal means and including two sections interconnected at a center tap; each of said sections having a response characteristic corresponding to the response characteristic of the respective restraining means associated with each direction of precession; and an adjustable contact movable with said gyroscope about said one mounting axis and relative to said two sections.

13. A device for measuring accurately velocities of very small magnitude as claimed in claim 12, in which the outer ends of said voltage divider are interconnected and said electrically energized signal circuit means includes a source of potential and means for applying the potential thereof between said center tap and the interconnected outer ends of said voltage divider; and said signal circuit means includes circuit means connected, respectively, to the interconnected outer ends of the voltage divider and said movable contact.

14. A device for measuring accurately velocities of very small magnitude as claimed in claim 13, including a second voltage divider comprising a fixed resistance having one end connected to said center tap and the other end connected to the interconnected outer ends of said first voltage divider; said second voltage divider including a manually adjustable contact; the signal voltage being derived between said two adjustable contacts.

15. A device for measuring accurately velocities of very small magnitude as claimed in claim 2, in which said signal circuit means includes slip ring means associated with one of said gimbal means; electrical driving means for said mass; and means, including such slip ring means, for supplying power to said electrical driving means.

References Cited in the file of this patent
UNITED STATES PATENTS

| | | |
|---|---|---|
| 1,678,914 | Richardson | July 31, 1928 |
| 1,924,558 | Kennedy | Aug. 29, 1933 |
| 2,426,213 | Herondelle | Aug. 26, 1947 |
| 2,444,625 | Bevins | July 6, 1948 |
| 2,898,552 | McNatt | Aug. 4, 1959 |
| 2,973,650 | Glenny | Mar. 7, 1961 |

OTHER REFERENCES

Hermann (German) application 1,039,771, Sept. 25, 1958 (corresponding U.S. Koril et al. 3,053,095, Sept. 11, 1962).